United States Patent Office 3,437,406
Patented Apr. 8, 1969

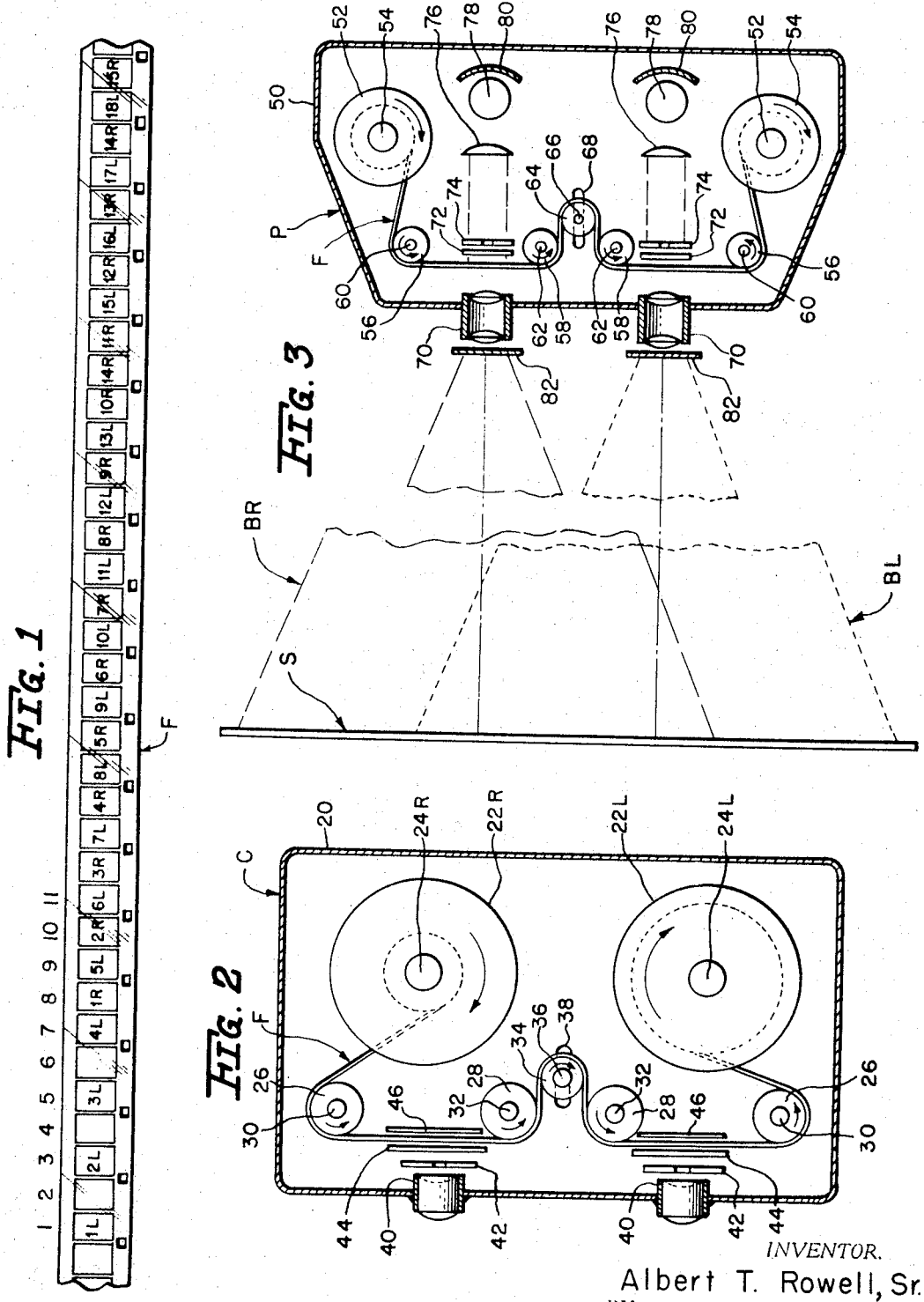

3,437,406
METHOD AND APPARATUS FOR STEREOSCOPIC PHOTOGRAPHY
Albert T. Rowell, Sr., 4900 W. Lunt Ave., Skokie, Ill. 60076
Filed Oct. 22, 1965, Ser. No. 501,097
Int. Cl. G03b *35/10, 35/20*
U.S. Cl. 352—60    7 Claims

ABSTRACT OF THE DISCLOSURE

A method and apparatus for photographing and projecting horizontally running motion picture film stereoscopically, wherein two pictures are simultaneously, directly taken or projected at spaced intervals on separate frames of a strip of film which are spaced from each other a distance equal to the length of an even number of frames by means of horizontally spaced lenses, and then the film having sprocket holes only adjacent alternately spaced frames is advanced a distance equal to the length of two frames and then the process is repeated.

---

This invention relates to stereoscopic photography, and more particularly to a novel arrangement for the relationship of the film frames to the camera and projector.

The invention comprehends a stereoscopic photography system suitable for use with either motion picture film or transparent slides.

In the past, many attempts have been made to produce motion picture films in stereo or three-dimensional characters of a quality comparable to that of conventional two-dimensional films. One such system requires the use of two cameras and two projectors. Not only is it expensive to build and maintain a system of this type but it is also extremely difficult, if not impossible, to effect the synchronization necessary to achieve satisfactory viewing results with this type of system.

Attempts have also been made in the past to obtain stereoscopic effects with the use of a single strip of film, but these arrangements have been complex and complicated to use because of their reliance on moving polarizing devices such as the type disclosed in United States Letters Patent No. 2,478,891.

Another type of arrangement using a single strip of film is that disclosed in U. S. Letters Patent No. 2,729,138, wherein the arrangement utilizes alternate frame stereoscopic film with a common film gate having a pair of adjacent apertures spaced in the direction of film travel in such relation that successive frames of the film will register simultaneously therewith for simultaneous projection on the screen. Thus, each frame is projected successively through each of the two apertures, so that whenever the shutter of the projector is open, there will be both a right eye and a left eye image on the screen. In order to separate the right and left images for proper viewing, the projector incorporates a polarizing device for polarizing in opposite directions the two beams carrying these images, and the operation of this device is so coordinated with the film feeding mechanism of the projector that the direction of polarization of each beam is shifted through 90 degrees each time the film advances one frame. Not only does this arrangement require a rotating polarization mechanism, but it also requires a complex set of prisms to transmit the beams, because the alternate frames are immediately adjacent each other.

Other systems such as that disclosed in U.S. Letters Patent No. 3,019,698 also require prism systems because of the close proximity of the adjacent film frames to each other.

It is therefore a primary object of this invention to provide a method and apparatus for stereoscopic photography which utilizes a single camera and single projector with a film arrangement having the cooperating right and left frames of a common image spaced from each other, rather than located immediately adjacent each other.

Another object of the invention is the provision, for use in a stereoscopic photography system, of photographing and projecting apparatus adapted to expose and project in pairs related frames of a motion picture film strip which are not immediately adjacent to each other, but which are spaced from each other.

A more specific object of the invention is the provision, in a stereoscopic photography system, of means for alternately exposing (or projecting) a pair of related frames of a film strip which are spaced from each other a distance equal to the length of an even number of frames and then advancing the film in the camera (or projector) a distance equal to the length of two frames while at the same time preventing the exposure (or projection) of the two frames immediately following the two previously exposed (projected) frames.

These and other objects of the invention will be apparent from an examination of the following description and drawings, wherein:

FIGURE 1 is a plan view of a section of motion picture film of the type employed in the invention;

FIGURE 2 is a schematic view, partly in transverse section, of a camera of the type employed in the invention; and FIGURE 3 is a schematic view, partly in transverse section, of a projector of the type employed in the invention.

It will be understood that, for purposes of clarity, certain elements have not been shown in detail, as their specific structure is not as important to the invention as the relative locations of these elements.

Referring now to the drawing for a better understanding of the invention, and particularly to FIGURE 1, it will be seen a strip, indicated generally at F, of motion picture film is shown. The frames of the film are numbered to represent the manner in which they are exposed (and/or projected) in the practice of my invention.

The frames are numbered in sequence, with respect to the order in which they are exposed (and/or projected), with the frames associated with the left and right lenses of the camera (and/or projector) being indicated with an L and R, respectively. For purpose of reference, frame 1L is considered to be the first frame of the strip.

It should be noted that adjacent film sprocket holes H are preferably spaced from each othera a distance equal to the length of two frames and are located to the left of each frame L, so that when the film is advanced it moves across each lens of the camera (and/or projector) two frames at a time in a manner hereinafter described more specifically in connection with an explanation of the operation of the apparatus.

Turning now to FIGURE 2, it will be seen that a camera embodying features of my invention, is indicated generally at C. The camera is merely illustrated in a schematic form without detailed illustrations of the standard camera elements, such as the lens, shutter, film transport and film advance mechanisms, as the structural details of these mechanisms may be of a conventional character which do not relate to the novel features of my invention. This explanation also applies to the projector elements hereinafter referred to in the specification.

The camera includes a housing 20 within which are disposed a pair of first and second film transporting reels or spools 22 and 24, mounted on a pair of parallel shafts 26 and 28, respectively.

Disposed forwardly of each reel 22 are a pair of cooperating outboard and inboard film positioning rollers 26 and 28, mounted for rotation about shafts 30 and 32, respectively, which are parallel to shafts 24.

A film take-up or adjustment roller 34 may be mounted midway between and slightly rearwardly of inboard rollers 28. Roller 34 is rotatably mounted on a shaft 36 which is also parallel to shafts 24 and which is slidably mounted in a slot 38, extending transversely of the housing, to permit limited forward or rearward movement of roller 34 within the housing. The purpose of roller 34 is described later in the specification.

Still referring to FIGURE 2, it will be seen that a pair of left and right objective or front lens assemblies 40 each of which include an objective lens 41, an apertured frame 42, and a shutter mechanism 44 are mounted in the front wall of the housing with one lens assembly being positioned between each pair of positioning rollers 26 and 28.

Rearwardly of the lenses and forwardly of the related sections of film are mounted aperture frames 42 and shutter mechanisms 44. A pair of backing plates 46 are mounted rearwardly of the film in alignment with the respective shutter mechanisms 44.

The shutter mechanisms are not shown in detail, as they may be of a conventional type, except that they are arranged to operate in tandem with each other. The shutters are arranged to open and close automatically in timed relation with the film transport and film advance mechanisms, so that the shutters will open to expose one frame of film at each lens assembly and then will close while the frames of film immediately following the respective exposed frames pass behind the lenses.

In the arrangement illustrated in the drawing, the lens assemblies are spaced from each other a sufficient distance so that, when frame 1L (the first frame) is in alignment with the left (or bottom) lens of the camera, as seen in FIGURE 2, frame 1R (the 8th frame) will be in alignment with the right (or top) lens, as seen in FIGURE 2.

Thus, when the film is advanced two frames, frame 2L (the third frame) will be in alignment with the left lens and frame 2R (the 10th frame) will be in alignment with the right lens. While the film is advanced, the shutter, of course, will be closed, so that the second and ninth frames (which are the frames immediately following frames 1L and 1R will not be exposed. The steps are then repeated alternately so that only the odd numbered frames (counting 1L as the first frame) will ever be exposed through the left lens and only the even numbered frames (counting 1R as the eighth frame) will ever be exposed through the right lens.

Now turning to FIGURE 3, it will be seen that a projector, indicated generally at P, embodying features of the invention, is shown as having the same general internal arrangement as the camera.

The projector includes a housing 50 having a pair of film reels 52 mounted within on parallel shafts 54. Also mounted within the housing in front of reels 52 are pairs of outboard and inboard positioning rollers 56 and 58, mounted on shafts 60 and 62, respectively.

Between inboard rollers 58 a take-up roller 64 is rotatably mounted on a shaft 66, which is in turn mounted within a transversely extending slot 68 to permit its limited movement toward and away from the positioning rollers.

A pair of left and right objective lens assemblies 70 each comprising an objective lens 71, a shutter mechanism 72, an apertured frame 74, and a condensing lens 76 are mounted within the front wall of the housing, with each assembly being positioned between each pair of positioning rollers 56 and 58.

Rearwardly of the film sections between each pair of positioning rollers and in alignment with each lens are positioned a shutter mechanism 72, an aperature frame 74, a condensing lens 76, a light source 78, and a reflector 80.

Again, it will be understood that these mechanisms are not illustrated in detail as their structures may be conventional, and they do not per se form an essential feature of the invention.

The shutter mechanisms are arranged to work in tandem in the same relationship to the film transport and film advance mechanisms as the shutter previously described in connection with the camera operation.

The lens assemblies are spaced from each other a sufficient distance so that when frame 1L is in alignment with the left lens frame 1R is in alignment with the right lens. Also, the shutters are timed to close when the frames immediately following the respective exposed frames are in alignment with the respective lenses.

If desired, the camera and projector lens assemblies and the inboard positioning rollers may be made adjustable for purposes of precise alignment of projected images with the inboard positioning or advancing rollers mounted for movement with the related lens assemblies, and the purpose of the take-up rollers, which are preferably spring-loaded (not shown) is to take up any slack in the film caused by the movement of the lens assemblies and related inboard positioning rollers to insure proper spacing at all times between the film frames which are in alignment with the respective lenses. This is especially important if the lens assemblies are pivotally mounted to permit a limited degree of tow-in which is necessary to obtain proper convergence in close distance photography.

In front of the lenses are mounted left and right polarizing filters 82 which polarize the light beams passing through the respective lens assemblies, as the beams are projected onto a screen S.

It will be understood that the left and right images as photographed through the left and right lenses of the camera, and projected through the left and right lenses of the projector, are projected in partially overlapped or overlying relation on the screen with the centers of the respective images spaced from each other substantially the same distance as the distance between the camera and projector lenses. As is conventional with stereoscopic systems, this distance is preferably the average distance between the eyes of a person.

In viewing the picture, a person will, of course, wear a pair of glasses with a left and a right polarizing lens, so that the left eye will see only the left image and the right eye will see only the right image, as photographed by the camera and projected by the projector.

Thus, it will be seen that an important advantage of my novel stereoscopic photographic system is that only a single strip of film is used, and only one camera and projector are required. Also, neither the camera nor the projector requires a complex system of prisms or moving polarizing devices.

Another important advantage of this system is that by providing related frames in pairs which are not immediately adjacent to each other, greater flexibility is provided with respect to the width of the individual frames, and also with respect to the distance between the frames of each related pair.

I claim:
1. A camera for use in stereoscopic motion picture photography, comprising in combination:
   (a) a housing;
   (b) a pair of lenses mounted in one wall of the housing;
   (c) means for transporting horizontally a strip of motion picture film, having sprocket holes located only adjacent alternately spaced frames, from one end of the camera to the other behind said lens;
   (d) said lenses being aligned horizontally and spaced from each other a distance sufficient for exposing simultaneously a pair of related frames of the film, which frames are located in direct alignment with said lenses and which are spaced from each other longitudinally of the film a predetermined distance equal to the combined lengths of an even number of frames;
(e) means for continuously sequentially advancing horizontally the film a distance equal to the combined lengths of two frames;
(f) shutter means associated with each of said lenses;
(g) means for automatically closing the shutter means, while the film is being advanced, to prevent the exposure of the two frames immediately following the previously exposed frames.

2. A camera according to claim 1 wherein at least one of said lenses and said film advancing means are movably mounted in the housing, and including means for automatically taking up any slack in the film resulting from movement of said lens and film advancing means to maintain uniform spacing between related frames of the film at all times.

3. A projector for use with stereoscopic motion picture film, having sprocket holes located only adjacent alternately spaced frames and having pairs of related images on frames of film spaced from each other a distance equal to an even number of frames, comprising in combination:
(a) a pair of lenses aligned horizontally and spaced from each other;
(b) means for passing beams of light through each lens to directly project simultaneously a pair of related images;
(c) means for continuously sequentially advancing the film horizontally two frames at a time after each related pair of images have been projected;
(d) means for automatically preventing the projection of the images on the two frames immediately following the respective previously projected frames.

4. A projector according to claim 3, wherein at least one of said lenses and said film advancing means are movably mounted.

5. A projector according to claim 4, wherein said one lens and said film advancing means are mounted for pivotal movement.

6. A projector according to claim 4, and including means for automatically taking up any slack in the film resulting from movement of said lens and said film advancing means.

7. A projector according to claim 6, wherein said film slack take-up means includes a film engaging roller which is rotatably mounted on a shaft which, in turn, is slidably mounted for lateral movement.

References Cited

UNITED STATES PATENTS

| | | | |
|---|---|---|---|
| 1,559,893 | 11/1925 | Lane et al. | 352—60 |
| 2,298,586 | 10/1942 | Phillips | 95—18 |

FOREIGN PATENTS 808,162  11/1936  France.

JULIA E. COINER, *Primary Examiner.*

U.S. Cl. X.R.

352—239, 40, 44